(12) United States Patent
Kim et al.

(10) Patent No.: US 9,988,297 B2
(45) Date of Patent: Jun. 5, 2018

(54) GLASS COMPOSITION FOR VITRIFYING FLAMMABLE WASTE PRODUCTS

(71) Applicant: KOREA HYDRO & NUCLEAR POWER CO., LTD., Gyeongju-si, Gyeongsangbuk-do (KR)

(72) Inventors: Deuk Man Kim, Daejeon (KR); Sung Jun Maeng, Daejeon (KR); Cheon Woo Kim, Daejeon (KR)

(73) Assignee: Korea Hydro & Nuclear Power Co., Ltd., Gyeongju-si, Gyeongsangbuk-do (KR)

( * ) Notice: Subject to any disclaimer, the term of this patent is extended or adjusted under 35 U.S.C. 154(b) by 0 days. days.

(21) Appl. No.: 15/101,595

(22) PCT Filed: Dec. 27, 2013

(86) PCT No.: PCT/KR2013/012306
§ 371 (c)(1),
(2) Date: Jun. 3, 2016

(87) PCT Pub. No.: WO2015/083881
PCT Pub. Date: Jun. 11, 2015

(65) Prior Publication Data
US 2017/0036944 A1    Feb. 9, 2017

(30) Foreign Application Priority Data
Dec. 4, 2013   (KR) ........................ 10-2013-0150221

(51) Int. Cl.
| | | |
|---|---|---|
| C03C 3/06 | (2006.01) |
| C03C 3/068 | (2006.01) |
| C03C 3/064 | (2006.01) |
| C03C 3/091 | (2006.01) |
| C03C 3/095 | (2006.01) |
| G21F 9/00 | (2006.01) |

(52) U.S. Cl.
CPC .............. *C03C 3/068* (2013.01); *C03C 3/064* (2013.01); *C03C 3/091* (2013.01); *C03C 3/095* (2013.01); *G21F 9/001* (2013.01); *C03C 2214/14* (2013.01)

(58) Field of Classification Search
CPC ... C03C 3/06; C03C 3/068; C03C 3/064; C03C 3/091; G21F 9/001
USPC .......................................................... 588/12
See application file for complete search history.

(56) References Cited

U.S. PATENT DOCUMENTS

| | | | |
|---|---|---|---|
| 4,097,401 A | 6/1978 | Guber et al. | |
| 5,547,482 A * | 8/1996 | Chalk .................... | C03B 19/06 65/17.2 |
| 7,019,189 B1 | 3/2006 | Chekhmir et al. | |
| 7,550,645 B2 | 6/2009 | Chekhmir et al. | |
| 7,825,288 B2 | 11/2010 | Chekhmir et al. | |
| 2005/0022698 A1* | 2/2005 | Mazany .................. | C03C 1/006 106/600 |
| 2006/0122450 A1 | 6/2006 | Kim et al. | |
| 2006/0189471 A1 | 8/2006 | Chekhmir et al. | |
| 2010/0022380 A1 | 1/2010 | Chekhmir et al. | |
| 2013/0178685 A1 | 7/2013 | Cho et al. | |

FOREIGN PATENT DOCUMENTS

| | | |
|---|---|---|
| CN | 101501786 A | 8/2009 |
| JP | 52-016518 A | 2/1977 |
| JP | 03-235099 A | 10/1991 |
| JP | 06-092644 A | 4/1994 |
| JP | 2007-527005 A | 9/2007 |
| KR | 10-2004-0018856 A | 3/2004 |
| KR | 10-0432450 B1 | 5/2004 |
| KR | 10-2006-00581093 A | 5/2006 |
| KR | 10-0768093 B1 | 10/2007 |
| KR | 10-1100614 B1 | 12/2011 |
| WO | WO 2008/070194 A2 | 6/2008 |

OTHER PUBLICATIONS

Japanese Office Action dated Sep. 5, 2017.
Chinese Office Action dated Sep. 27, 2017.

* cited by examiner

*Primary Examiner* — Edward Johnson
(74) *Attorney, Agent, or Firm* — Rabin & Berdo, P.C.

(57) ABSTRACT

This invention relates to the vitrification of radioactive waste products. According to this invention, a glass composition, which is suitable for flammable waste products, such as gloves, working clothes, plastic waste, and rubber, and a method of vitrifying the flammable waste products using the same are provided to significantly reduce the volume of radioactive waste products and to vitrify the flammable waste products using the glass composition, which is suitable for vitrifying the flammable waste products, thereby maximally delaying or completely preventing the leakage of radioactive materials from a molten solidified body.

1 Claim, 11 Drawing Sheets

US 9,988,297 B2

GLASS COMPOSITION FOR VITRIFYING FLAMMABLE WASTE PRODUCTS

TECHNICAL FIELD

The present invention relates, in general, to the vitrification of radioactive waste products and, more particularly, to a glass composition, which is suitable for flammable waste products, such as gloves, working clothes, plastic waste, and rubber, discharged from a nuclear power plant, and a method of vitrifying the flammable waste products using the same.

BACKGROUND ART

Flammable waste products, such as gloves, working clothes, plastic waste, and rubber, which are radioactive waste products discharged from a nuclear power plant, are treated by being encased in cement or contained in a waste drum. There is demand for a technology of manufacturing a solidified body, from which radioactive materials do not leak, or leak into underground water at a much slower speed compared to a cement-solidified body, when the solidified body comes into contact with underground water, and another technology of significantly reducing the number of radioactive waste drums so that a waste disposal site may be used over a long period of time, in consideration of the fact that it is becoming difficult to build waste disposal sites.

Recently, various countries have actively made research into technologies for vitrifying radioactive waste products using glass media to meet this demand.

Meanwhile, examples of the related art regarding a process of vitrifying radioactive waste products include Korean Patent No. 10-0768093 (a method of vitrifying middle- and low-level radioactive waste products using iron/phosphate glass) and Korean Patent No. 10-0432450 (a system for treating middle- and low-level radioactive waste products). However, since the middle- and low-level radioactive waste products are different from high-level waste products in terms of the type, production amount, and chemical composition thereof, the technology for vitrifying high-level waste products is not capable of being applied to middle- and low-level radioactive waste products without any modification, and, regardless, a glass composition for vitrifying flammable waste products, such as gloves, working clothes, plastic waste, and rubber, is not disclosed in the patents.

DISCLOSURE

Technical Problem

Accordingly, the present invention has been made keeping in mind the above problems occurring in the related art, and an object of the present invention is to provide a glass composition which is most suitable for vitrifying flammable waste products.

Another object of the present invention is to provide a method of vitrifying flammable waste products using a glass composition for use in the flammable waste products.

Technical Solution

In order to accomplish the above objects, the present invention provides a glass composition for vitrifying a flammable waste product, the glass composition including $SiO_2$, $Al_2O_3$, $B_2O_3$, CaO, $K_2O$, $Li_2O$, MgO, $Na_2O$, and $TiO_2$.

The glass composition may further include $CeO_2$, CoO, $VO_2$, ZnO, and $ZrO_2$.

The glass composition includes 30 to 60 wt % of $SiO_2$, 6.5 to 8.5 wt % of $Al_2O_3$, 10 to 16 wt % of $B_2O_3$, 8 to 15 wt % of CaO, 1 to 6 wt % of $K_2O$, 2 to 10 wt % of $Li_2O$, 0.5 to 6 wt % of MgO, 8 to 28 wt % of $Na_2O$, and 2 to 5 wt % of $TiO_2$. When the glass composition further includes $CeO_2$, CoO, $VO_2$, ZnO, and $ZrO_2$, the glass composition includes 30 to 60 wt % of $SiO_2$, 6.5 to 8.5 wt % of $Al_2O_3$, 10 to 16 wt % of $B_2O_3$, 8 to 15 wt % of CaO, 1 to 6 wt % of $K_2O$, 2 to 10 wt % of $Li_2O$, 0.5 to 6 wt % of MgO, 8 to 28 wt % of $Na_2O$, 2 to 5 wt % of $TiO_2$, 0.1 to 5 wt % of $CeO_2$, 0.1 to 2 wt % of CoO, 0.1 to 5 wt % of $VO_2$, 1 to 5 wt % of ZnO, and 0.5 to 3 wt % of $ZrO_2$.

In order to accomplish the above objects, the present invention also provides a method of vitrifying a flammable waste product, the method including adding the flammable waste product and a glass composition including $SiO_2$, $Al_2O_3$, $B_2O_3$, CaO, $K_2O$, $Li_2O$, MgO, $Na_2O$, and $TiO_2$, together to a melting furnace.

The glass composition may further include $CeO_2$, CoO, $VO_2$, ZnO, and $ZrO_2$.

The glass composition includes 30 to 60 wt % of $SiO_2$, 6.5 to 8.5 wt % of $Al_2O_3$, 10 to 16 wt % of $B_2O_3$, 8 to 15 wt % of CaO, 1 to 6 wt % of $K_2O$, 2 to 10 wt % of $Li_2O$, 0.5 to 6 wt % of MgO, 8 to 28 wt % of $Na_2O$, and 2 to 5 wt % of $TiO_2$. When the glass composition further includes $CeO_2$, CoO, $VO_2$, ZnO, and $ZrO_2$, the glass composition includes 30 to 60 wt % of $SiO_2$, 6.5 to 8.5 wt % of $Al_2O_3$, 10 to 16 wt % of $B_2O_3$, 8 to 15 wt % of CaO, 1 to 6 wt % of $K_2O$, 2 to 10 wt % of $Li_2O$, 0.5 to 6 wt % of MgO, 8 to 28 wt % of $Na_2O$, 2 to 5 wt % of $TiO_2$, 0.1 to 5 wt % of $CeO_2$, 0.1 to 2 wt % of CoO, 0.1 to 5 wt % of $VO_2$, 1 to 5 wt % of ZnO, and 0.5 to 3 wt % of $ZrO_2$.

Advantageous Effects

According to the present invention, a glass composition, which is suitable for flammable waste products, such as gloves, working clothes, plastic waste, and rubber, and a method of vitrifying the flammable waste products using the same are provided to significantly reduce the volume of radioactive waste products and to vitrify the flammable waste products using the glass composition, which is suitable for vitrifying the flammable waste products, thereby maximally delaying or completely preventing the leakage of radioactive materials from a molten solidified body.

BEST MODE

A better understanding of the present invention may be obtained through the following Examples. It will be obvious to those skilled in the art that the Examples are set forth to illustrate the present invention but are not to be construed to limit the scope of the present invention.

Example 1. Experimental Method

In order to vitrify target waste products for vitrification, discharged from the Uljin nuclear power plant, the type and the concentration of inorganic substances contained in each waste product were evaluated, and a suitable additive was added to the inorganic substances that were generated in the waste products to thus select glass compositions that were excellent in terms of process variables of a melting furnace, the quality of a molten solidified body, and the volume reduction effect.

Figure 1:
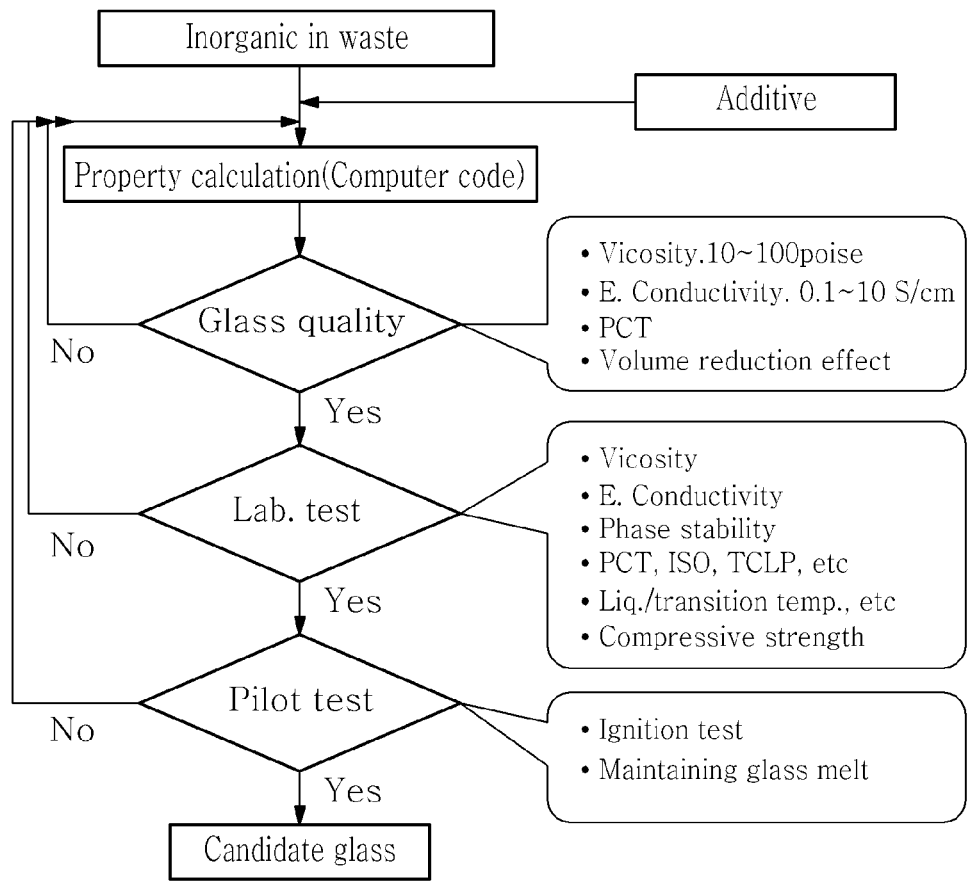
FIG. 1 is a flowchart showing the selection of a glass composition.

As shown in the flowchart of glass composition selection of FIG. 1, a process of selecting the candidate glass for each target waste product for vitrification included steps of selection of the additive (base glass frit), selection of the candidate glass, laboratory evaluation, and a pilot test.

The inorganic substances in the target waste products for vitrification should be mixed with the additive to form the glass composition meeting the vitrification process and the quality of the molten solidified body. First, the suitable additive, that is, the base glass frit, was selected based on the analyzed concentration of the inorganic substance in the waste product. The properties of the candidate glass depend on the amount of the inorganic substance that is added to constitutional components of the base glass frit (the waste loading amount).

As for main items which are evaluated by executing computer code, it is evaluated whether viscosity and electric conductivity values, which are important in views of the vitrification process, are in the range of 10 to 100 poise and 0.1 to 1.0 S/cm at an operating temperature of 1,150° C., and it is evaluated whether the 7-day PCT leaching rate, which is a factor for evaluating chemical robustness in view of the quality of the molten solidified body, is 2 g/m² or less with respect to the elements B, Na, Li, and Si. When the aforementioned two aspects are satisfied, the volume reduction effects of the waste products are very different from each other, but the volume reduction ratio of each waste product, which is evaluated to be at a suitable level, is calculated in order to select the candidate glass. Whether the candidate glass that was selected using the computer code operation satisfied the properties required in views of the vitrification process and the quality of the molten solidified body was evaluated during the laboratory operation, and was finally verified using the pilot test.

Example 2. Development of Candidate Glass (Simulation of Glass Composition)

In order to vitrify the target waste products for vitrification, AG8W1 was selected as the candidate glass of the mixed waste product (hereinafter, referred to as 'W1 waste product'), DG-2 was selected as the candidate glass of the flammable waste product (hereinafter, referred to as 'dry active waste'), and SG was selected as the waste resin using GlassForm 1.1 computation code. The components and main properties are described in Table 1.

TABLE 1

Properties of base glass frit and candidate glass (values at 1,150° C.)

| | W1 waste product Base/candidate glass | | Dry active waste Base/candidate glass | | Waste resin Base/candidate glass | |
|---|---|---|---|---|---|---|
| | AG8 | AG8W1 | DG-2Base | DG-2 | SG-B | SG |
| $Al_2O_3$ | 14.42 | 12.30 | 8.00 | 7.07 | 7.5 | 7.36 |
| $As_2O_5$ | 1.04 | 0.62 | — | — | — | — |
| $B_2O_3$ | 8.57 | 9.97 | 15.00 | 11.29 | 15.00 | 10.59 |
| BaO | — | — | — | 0.04 | — | — |
| CaO | — | 4.82 | — | 9.77 | — | 18.1 |
| $CeO_2$ | 1.04 | 0.62 | — | — | — | — |
| CoO | 0.52 | 0.31 | — | 0.01 | — | — |
| $Cr_2O_3$ | — | — | — | — | — | — |
| $Cs_2O$ | — | — | — | — | — | — |
| CuO | — | — | — | 0.01 | — | 2.86 |
| $Fe_2O_3$ | — | 1.78 | — | 0.35 | — | 2.86 |
| $K_2O$ | — | 1.63 | 2.00 | 4.47 | — | 7.3 |
| $Li_2O$ | 2.07 | 1.24 | 7.00 | 5.25 | 7.50 | 5.13 |
| MgO | — | 2.12 | 0.50 | 4.63 | — | 2.22 |
| $MnO_2$ | — | 0.05 | — | 0.17 | — | 0.32 |
| $Na_2O$ | 24.17 | 17.57 | 11.00 | 10.06 | 7.50 | 4.5 |
| NiO | — | — | — | 0.11 | — | — |
| $P_2O_5$ | — | 0.40 | — | 0.82 | — | — |
| PbO | — | — | — | 0.02 | — | — |
| $SiO_2$ | 44.52 | 43.14 | 55.00 | 41.25 | 62.50 | 37.5 |
| SrO | — | — | — | 0.14 | — | — |
| $TiO_2$ | — | 1.24 | — | 3.09 | — | — |
| $VO_2$ | 2.10 | 1.26 | — | 0.08 | — | — |
| ZnO | — | — | — | 0.22 | — | 1.26 |
| $ZrO_2$ | 1.55 | 0.93 | 1.50 | 1.13 | — | — |
| Loading amount of inorganic substance (wt %) | 0 | 40 | 0 | 25 | 0 | 40 |
| Density (g/cm³) | 2.59 | 2.67 | 2.40 | 2.65 | 2.62 | 2.65 |
| Viscosity (poise)+ | 62 | 67 | 33 | 10 | 86 | 4 |
| Electric conductivity (S/cm)+ | 0.62 | 0.31 | 0.57 | 0.46 | 0.35 | 0.40 |
| 7-day PCT (g/m²) | — | Si, B, Li, Na < 2 | — | Si, B, Li, Na < 2 | — | Si, B, Li, Na < 2 |

Experimental Example 1. Test of Physical/Mechanical Properties

The viscosity, electric conductivity, phase homogeneity, liquidus temperature, transition temperature, softening point, thermal expansion coefficient, and compressive strength of the AG8W1 candidate glass of the W1 waste product, the DG-2 candidate glass of the dry active waste, and the SG candidate glass of the waste resin, which were selected in Example 2, were tested as follows.

(1) Viscosity and Electric Conductivity

Figure 2:
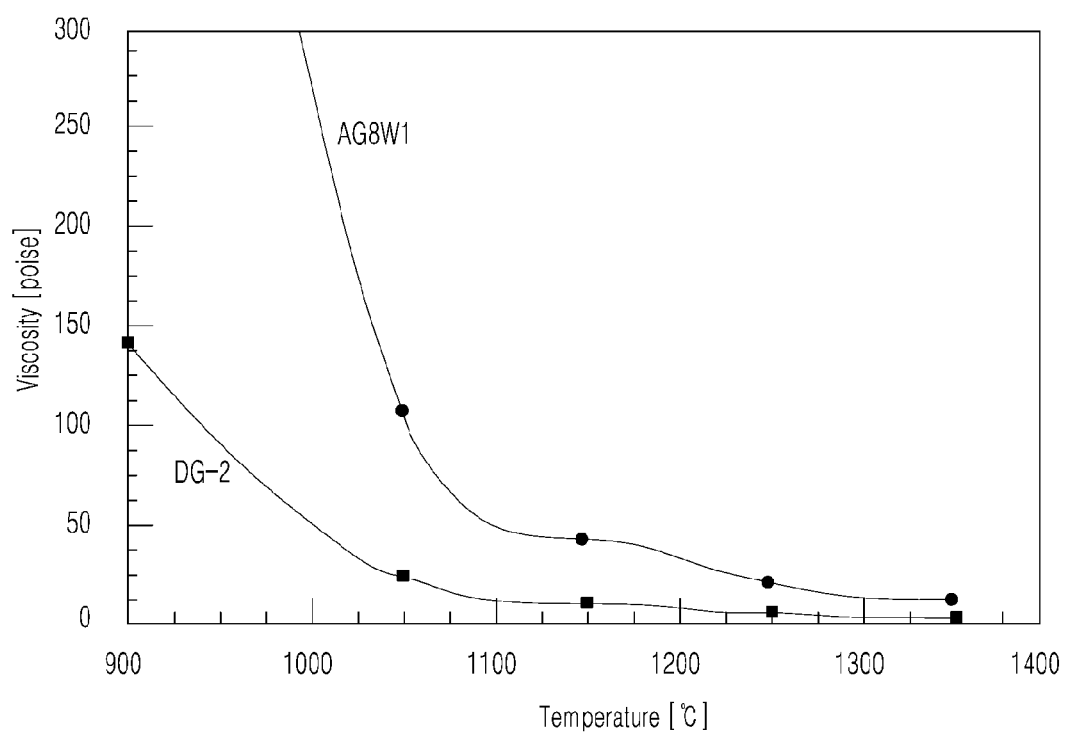
FIG. 2 is a graph showing a change in viscosity of AG8W1 and DG-2 candidate glass.
Figure 3:
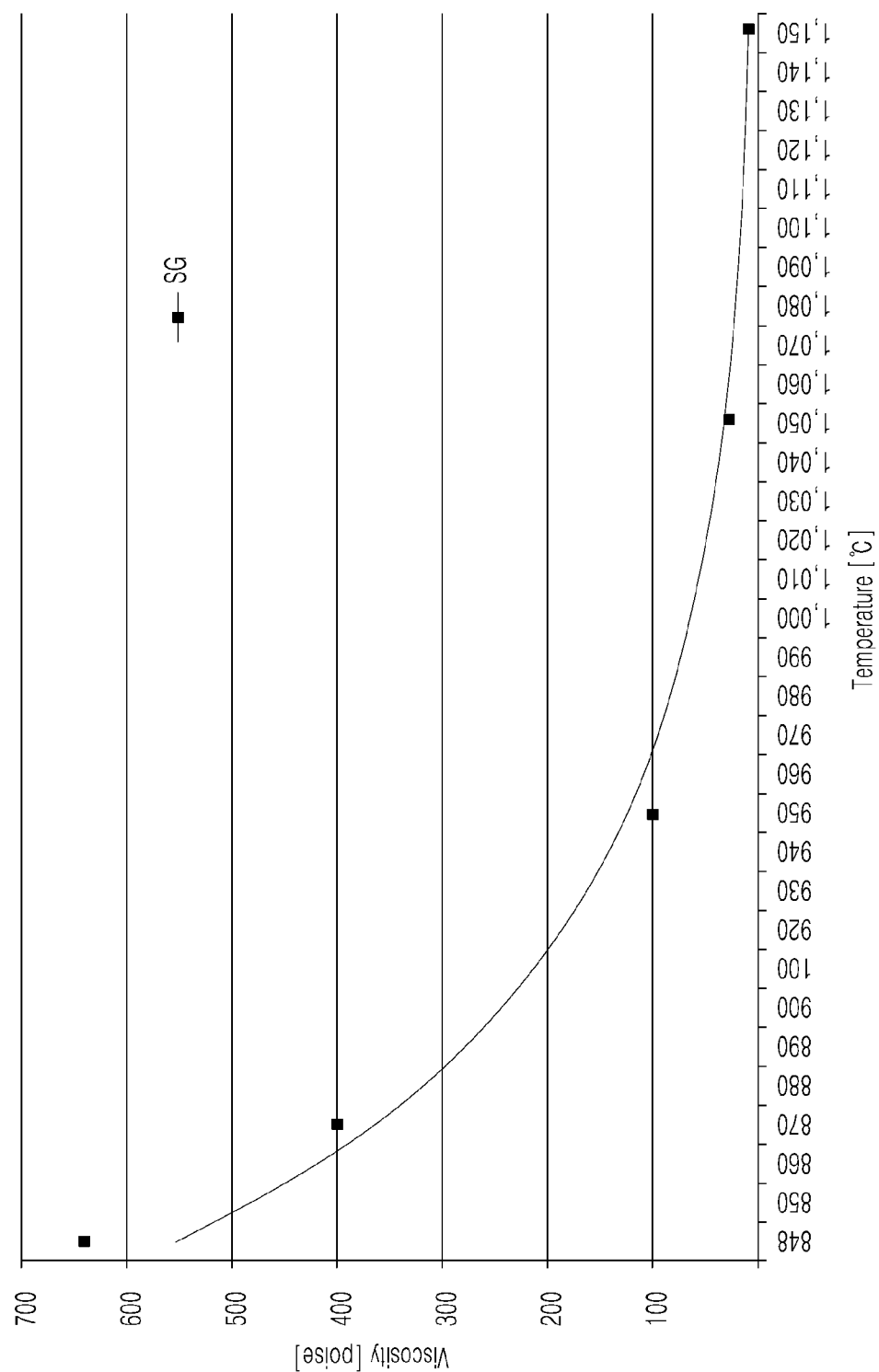
FIG. 3 is a graph showing a change in viscosity of SG candidate glass.
Figure 4:
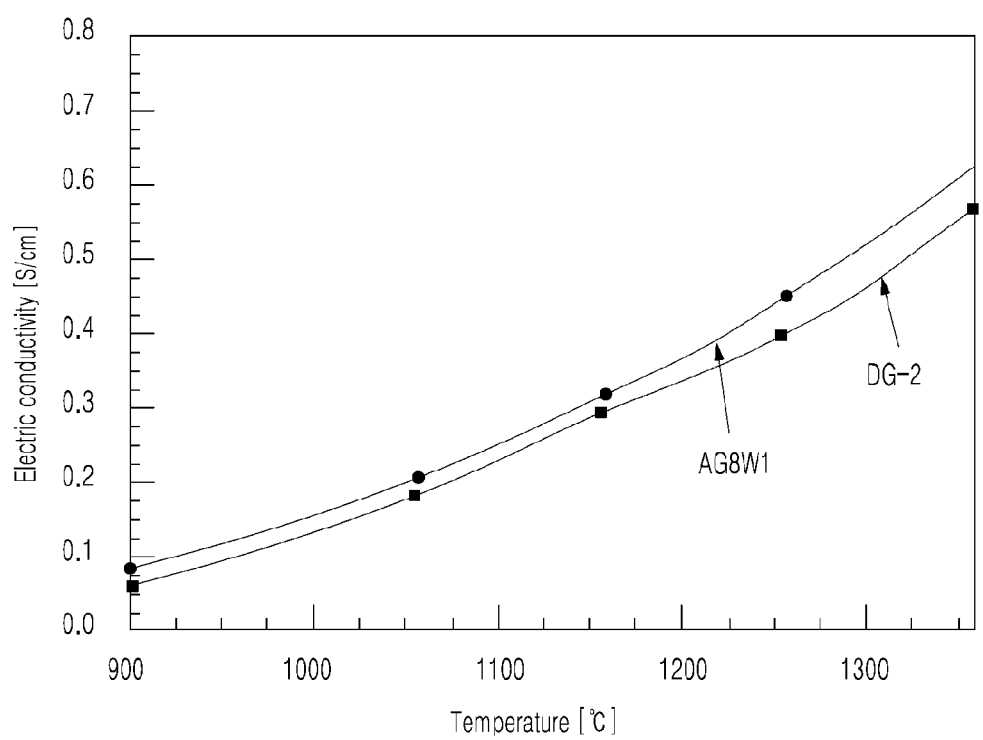
FIG. 4 is a graph showing a change in electric conductivity of the AG8W1 and DG-2 candidate glass.
Figure 5:
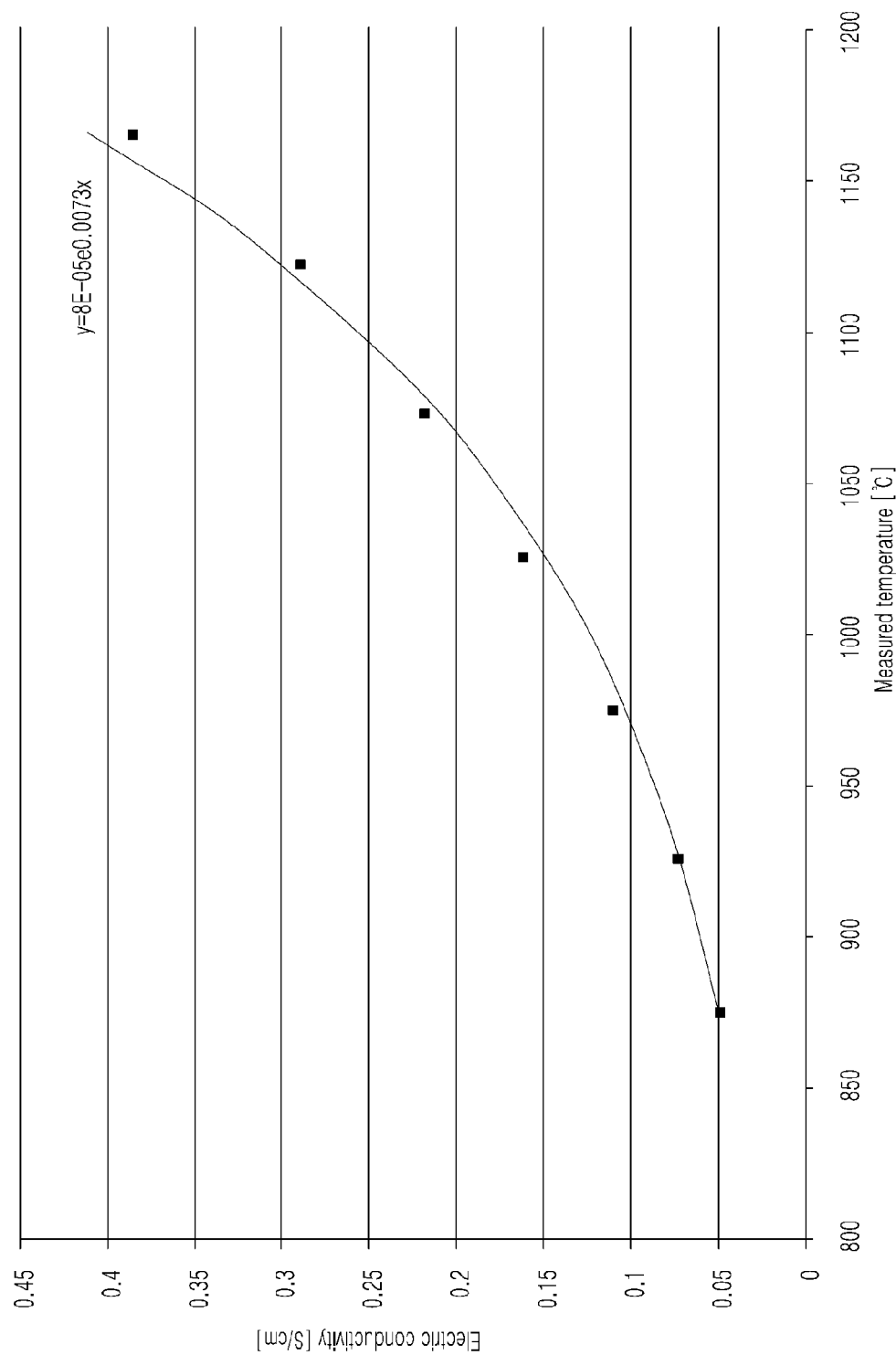
FIG. 5 is a graph showing a change in the electric conductivity of the SG candidate glass.

From FIGS. 2 and 3, it was confirmed that the viscosity of the DG-2, AG8W1, and SG candidate glass was in the required range of 10 to 100 poise at the operating temperature of 1,150° C. when measured. Further, from FIGS. 4 and 5, showing the result of measurement of electric conductivity, it could be seen that all of the DG-2, AG8W1, and SG candidate glass satisfied the required value of electric conductivity at 1000° C. or higher.

(2) Phase Homogeneity and Liquidus Temperature

When the glass is melted over a long period of time, it is very important to maintain the glass at the liquidus temperature or higher in order to prevent crystals from being formed. When the homogeneous molten glass is formed at the melting temperature, normal production of the glass and long-term operation are feasible. On the other hand, when a crystal phase is formed, precipitation may occur, eventually clogging a glass outlet and possibly affecting the chemical robustness of the glass, that is, leachability. It is empirically known that the difference between the temperature of a melting state and the liquidus temperature of glass is preferably more than 100° C.

The three kinds of candidate glass (AG8W1, DG-2, and SG) were subjected to a heat-treatment test at 950° C. for 20 hr, and analyzed using SEM/EDS. As a result, crystals were not formed at a meniscus and not at the boundary of a crucible. The minimum temperature, at which the crystals were not formed, determined from the result of the heat-treatment test for 20 hr, was defined as the liquidus temperature of the glass. From the result of the test, the liquidus temperature of the candidate glass was estimated to be 950° C. or less. Therefore, it could be seen that there was no possibility of the molten glass being converted into crystals during the long-term vitrification process.

(3) Transition Temperature and Softening Point

Glass has a transition region, making it unlike crystals in physical and chemical aspects. In other words, it can be seen that, with respect to a change in volume as a function of temperature when the molten liquid is supercooled, the volume of a crystal is rapidly changed at the melting temperature, but the volume of the molten glass body is slowly changed, reaching an equilibrium state when the molten glass body is supercooled. The volume of glass changes depending on the temperature. The temperature at which the slope is changed is called a glass deformation temperature or a glass transition temperature Tg, and refers to a thermodynamically meta-stable equilibrium state.

The transition temperatures of the AG8W1 and SG candidate glass were evaluated to be about 498° C. and 466.7 to 498.1° C., respectively, when measured using analysis equipment. The softening points of the AG8W1 and SG candidate glass were measured to be 551° C. and 547° C., respectively.

(4) Thermal Expansion Coefficient

All existing constitutional elements of materials are vibrated by heat energy. Heat energy increases as the temperature is increased. Accordingly, a vibration width is increased, to thus increase the distance between two atoms connected by bonding force. In other words, expansion occurs as the temperature is increased. Vibration attributable to heat energy is limited by strong bonding in a solid state, but is not significantly limited in a liquid state, and accordingly, the expansion coefficient of liquid is large.

The respective thermal expansion coefficients of the AG8W1 and SG candidate glass were $107 \times 10^{-7}$ $K^{-1}$ and $98 \times 10^{-7}$ $K^{-1}$ when measured. It can be seen that these values are similar to the thermal expansion coefficient of typical soda lime glass.

(5) Compressive Strength

The compressive strength of glass in use has been considered as an important property, and an effort has been made for a long time into investigating the cause of breakage to thus produce stronger glass. A breaking process is directly connected to a fatigue phenomenon, and influences attributable to hysteresis and the characteristic condition thereof need to be well understood. Surface bonding is a very important factor and needs to be sufficiently considered in order to increase strength. The strength of glass corresponds to a value until a breakage line is formed through an entire piece of glass.

The AG8W1 and SG candidate glass was cooled from the transition temperature at a rate of about 2.7° C. per min to measure compressive strength, and the measured values were 2,146 psi and 7,985 psi. It is required that compressive strength be 500 psi or more based on US NRC requirements for cement, which is used to treat radioactive waste products. The aforementioned requirement may be applied to the molten solidified body, and accordingly, the compressive strength of the candidate glass may be evaluated as favorable.

Experimental Example 2. Leaching Property Test

The molten solidified body, which is formed during the vitrification process, must be chemically stable in intermediate storage and final waste disposal environments. The most main reason why glass is selected as a treatment medium of radioactive waste products among many other materials is that glass prevents radioactive materials from leaking into the environment and is capable of storing the radioactive materials for a long period of time due to the excellent chemical robustness thereof. Accordingly, the selected candidate glass compositions were tested and analyzed using the internationally certified leaching test methods in order to compare and evaluate the chemical stabilities of the molten solidified bodies. In order to perform a robustness comparison with the glass selected by the Nuclear Environment Technology Institute, the high-level R7T7 candidate glass of France and the SRL-EA benchmark glass of the USA were tested together.

(1) TCLP (Toxicity Characteristic Leaching Procedure)

The US EPA TCLP (Toxicity characteristic leaching procedure) test is the most important index indicating the stability of the solidified body against various accidents after final disposal of the molten solidified body. The risk that the molten solidified body may face in the final waste disposal site is leakage of radioactivity and harmful materials into water when the solidified body comes into contact with water, and the TCLP test may be considered as a simulation of this situation.

The molten solidified bodies (AG8W1, DG-2, and SG), which are obtained from research on selection of the glass composition, particularly contain vanadium (V), which is a strong oxidant, and chromium (Cr) and nickel (Ni), which are harmful materials, in small amounts in order to prevent the precipitation of reducing materials during the vitrification process. Accordingly, the TCLP test was performed using the three candidate glass compositions. In the TCLP test, the degree of elution of elements, which were regulated based on the Resources Conservation and Recovery Act (RCRA) (a total of 14 elements: Ag, As, Ba, Be, Cd, Cr, Hg, Ni, Pb, Sb, Se, Th, V, and Zn), into a leaching solution was analyzed. The concentrations of all target elements were analyzed to be the same as or lower than the detection limit of the analyzer, thereby satisfying all US EPA standards.

(2) ANSI/ANS 16.1 (American National Standards Institute/American Nuclear Society 16.1)

The ANSI/ANS 16.1 (American National Standards Institute/American Nuclear Society 16.1) leaching test, which was accomplished in a short period of time (three months), was performed as a leaching test for evaluating the chemical durability of the glass. The concentrations of main elements and simulated radionuclides, such as Co and Cs, which were leached from the molten solidified bodies, were analyzed to calculate effective diffusivity, and the average value of ten leaching indexes of each radionuclide, which were determined in ten leaching sections, was evaluated as the leachability index (Li) of the radionuclide.

Figure 6:
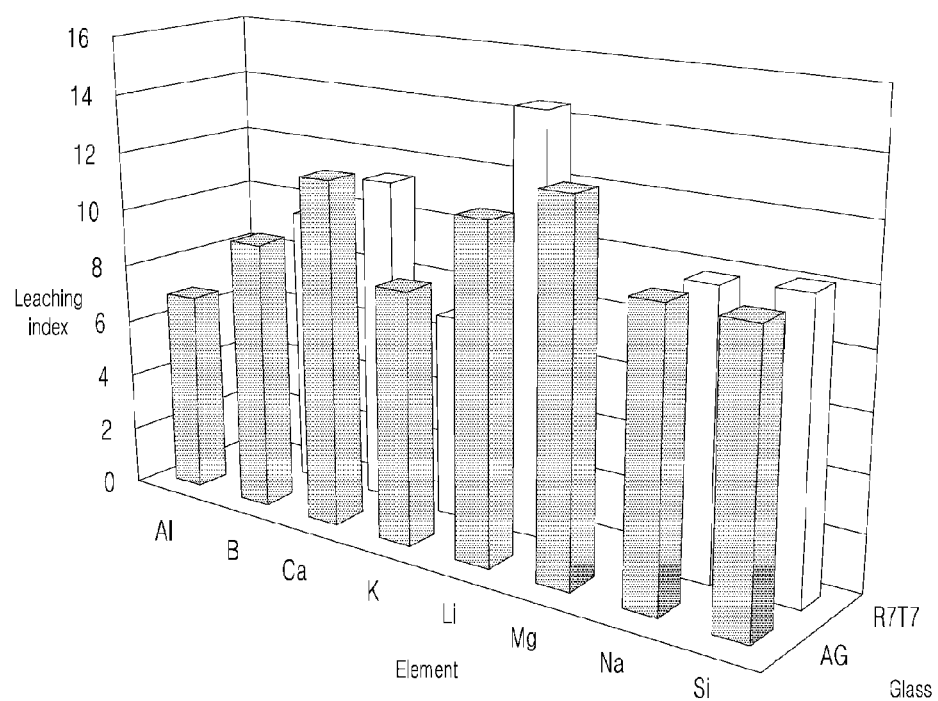
FIG. 6 shows the leaching index of ANSI/ANS 16.1 of the candidate glass.

As seen in FIG. 6, showing the result of the ANSI/ANS 16.1 leaching test, Co and Cs did not leak into a leachate during a test period of three months, and the leaching indexes of all elements were 6 or more, which was the US NRC requirement. After pollutants were rapidly separated from the surface of the sample in an early stage of the test, initially observed leaching from the waste product solidified body was considered to be mainly attributable to diffusion. The leaching index of the radionuclides depends on the magnitude of the mobility of chemical elements in the single solidified substance. Therefore, the leaching indexes of all elements of the candidate glass satisfied the US NRC requirement, namely 6.0 or more, and cobalt, which was contained in the glass, and cesium, which was added in a small amount to the AG8W1 glass in order to perform the present test, were not detected.

(3) PCT (Product Consistency Test)

The US DOE PCT (product consistency test) as a robustness test for measuring the stability, the homogeneity, and the reproducible component ratio of a solidified body is a test for comparing leaching behavior of the elements in the molten solidified body for at least 7 days or over a long period of time (hundreds of days) to leaching behavior of the benchmark glass. DG-2, AG8W1, and SG, and R7T7 of France were used as the candidate glass, and the SRL-EA (environmental assessment) glass, which was manufactured by the Savannah River National Laboratory in the USA, was used as the benchmark glass.

Figure 7:
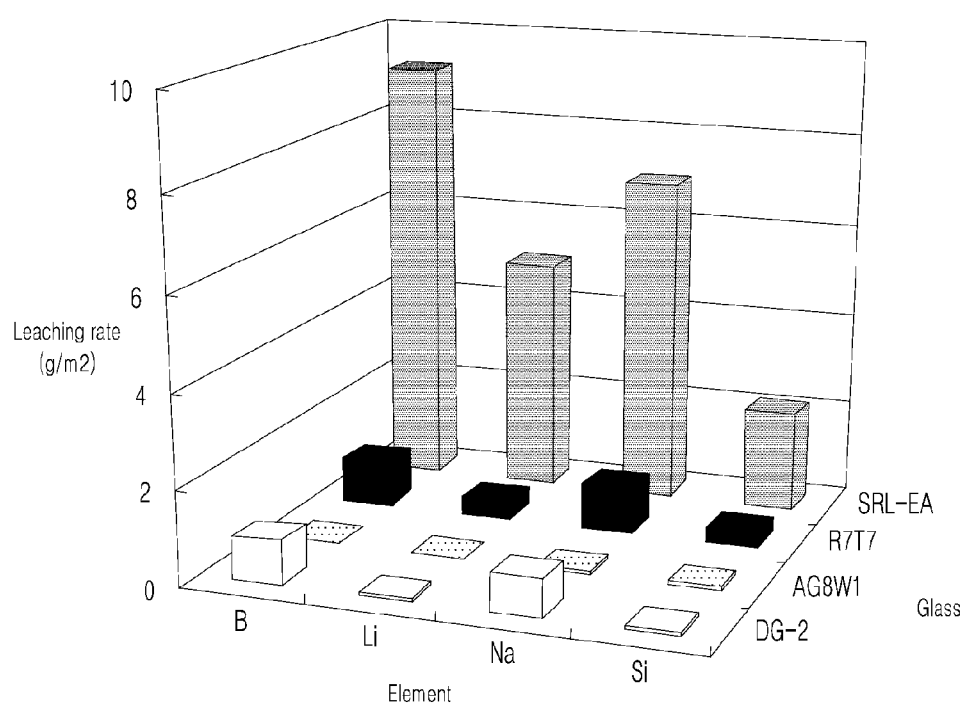
FIG. 7 shows the result of PCT leaching rates of the candidate glass and the benchmark glass after 7 days.
Figure 8:
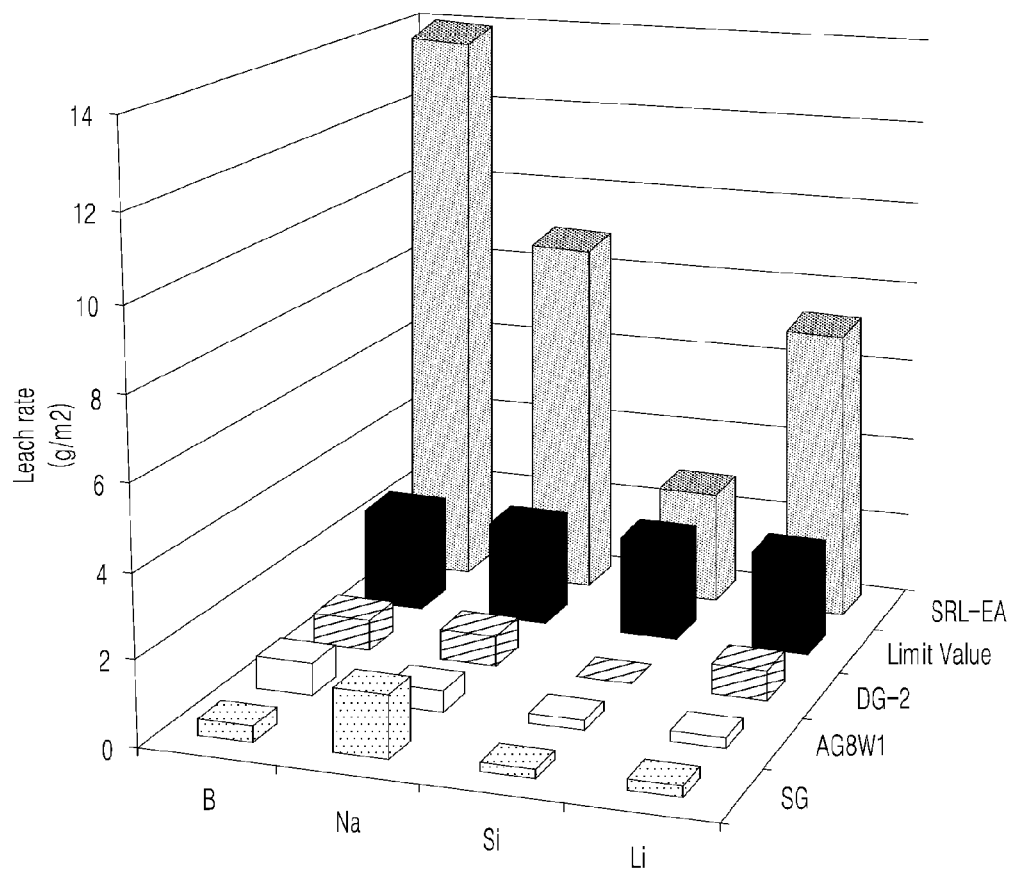
FIG. 8 shows the result of PCT leaching rates of the candidate glass and the benchmark glass after 7 days.

A PCT was performed on the DG-2, AG8W1, and SG candidate glass, the R7T7 candidate glass of France, and the SRL-EA benchmark glass for 7 days. As a result, the DG-2, AG8W1, and SG candidate glass exhibited relatively better leaching resistance than the R7T7 candidate glass and the benchmark glass, as shown in FIGS. 7 and 8. It is shown that the leaching rate of boron and sodium is higher than that of other elements. This is considered to be because a silicate compound is formed at a leaching boundary surface to thus reduce the concentration of the silicic acid in the leaching solution, but the leaching of other elements is increased. It is shown that the leaching resistance of four elements of the AG8W1 glass is relatively good compared to the DG-2 glass. The SG glass satisfied the US Hanford high/low-level vitrification limit, namely 2 g/m² or less.

Figure 9:
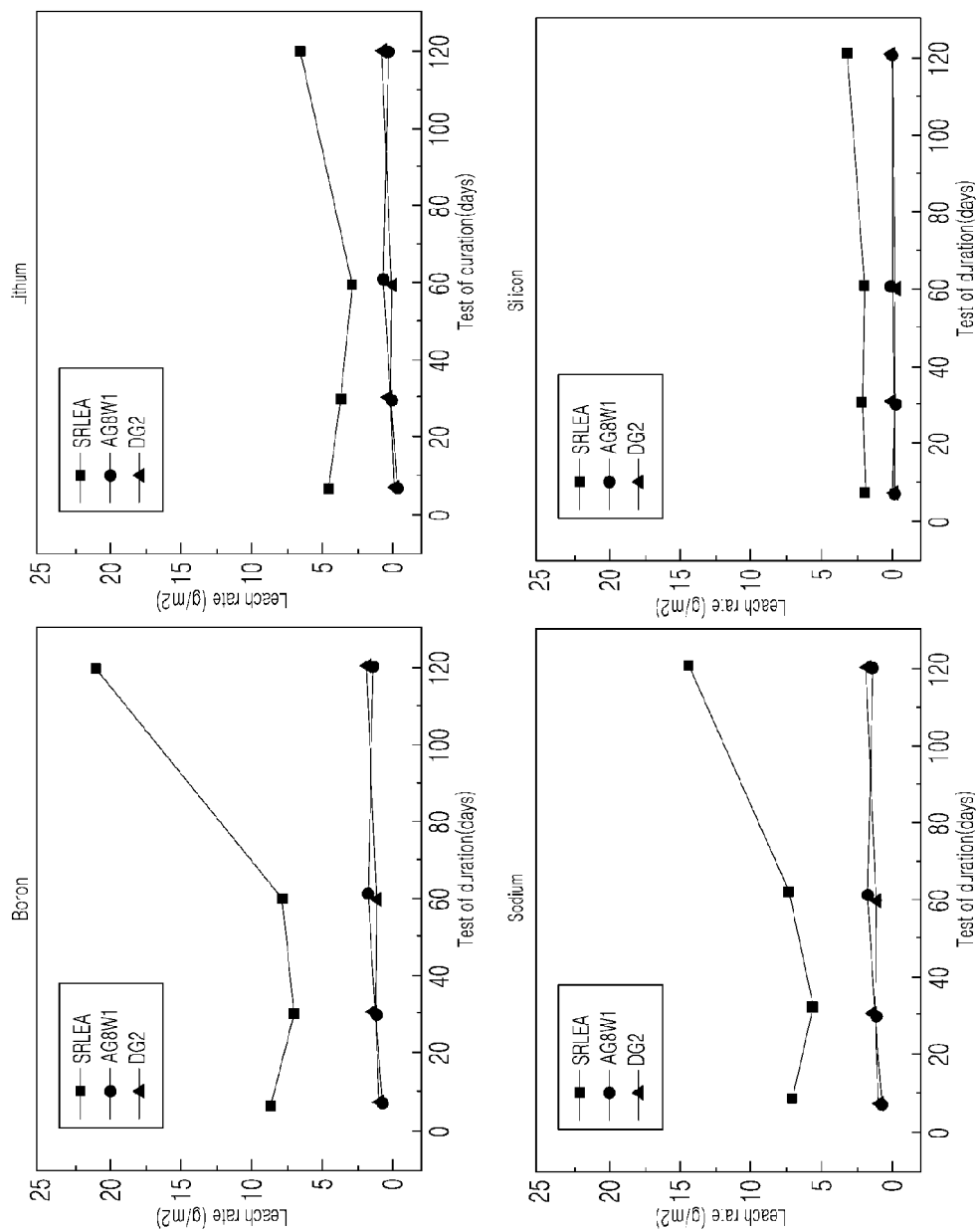
FIG. 9 shows the leaching result of the PCT over 120 days.

The candidate glass and the SRL-EA benchmark glass were subjected to a long-term leaching test for 120 days, and the result is shown in FIG. 9. It could be seen that the leaching rate of each element in the candidate glass was better than that of SRL-EA and was lower than the US Hanford high/low-level vitrification limit, namely 2 g/m² or less.

(4) ISO (International Standards Organization)

In order to evaluate the leaching mechanism of the elements constituting the molten solidified body and chemical integrity over a long period of time, a leaching test was performed using the ISO (International Standards Organization) standard test, which is a long-term leaching test.

Figure 10:
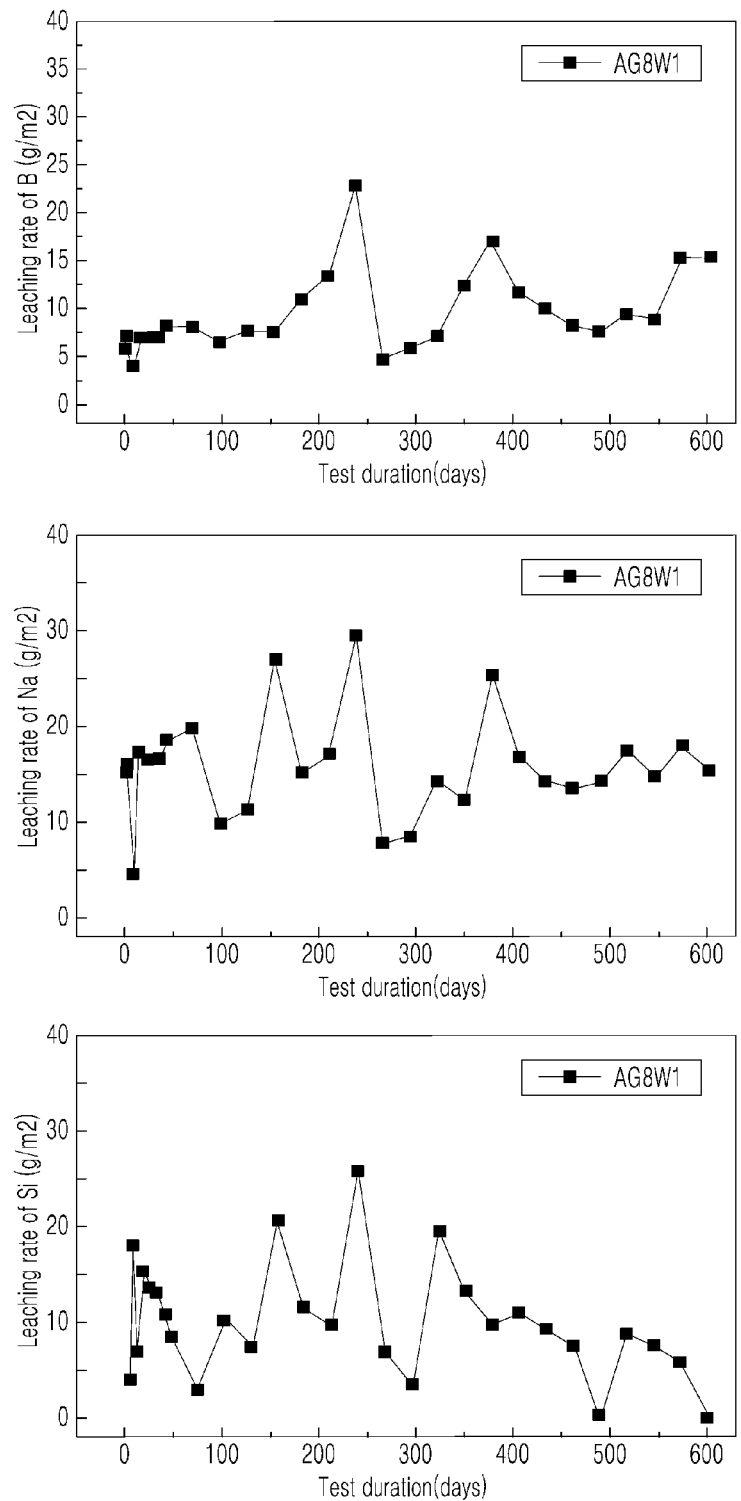
FIG. 10 shows the change in the leaching rate of each element according to an ISO leaching test.

AG8W1 was subjected to the leaching test over a long period of time to thus evaluate the leaching behavior of the main elements, which leaked from the glass structure into the leaching solution. FIG. 10 shows the development of the leaching rate change of B, Na, and Si for 602 days. The three elements in AG8W1 exhibited a relatively stable leaching rate.

Figure 11:
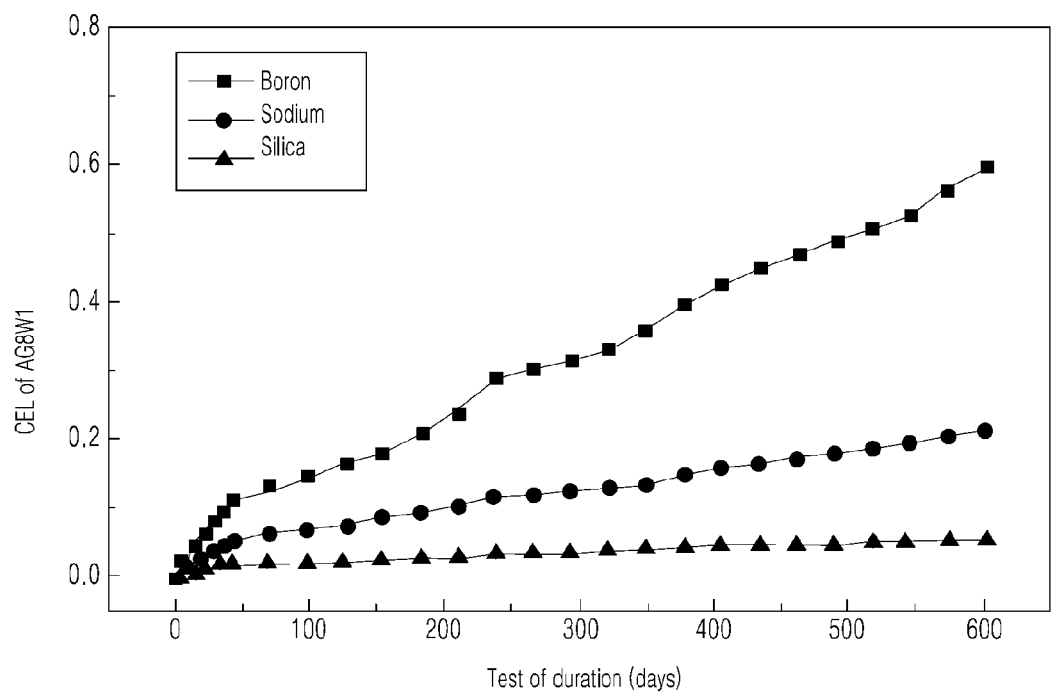
FIG. 11 shows a cumulative fraction leached of the AG8W1 candidate glass, depending on each element, according to the ISO leaching test.

FIG. 11 shows the cumulative fraction leached of the main elements. It could be seen that the curve of the cumulative fraction leached of B and Na rose with a very gentle slope but that Si, which constituted the main frame of the glass structure, was saturated. It is considered that the concentration of silicic acid in the leaching solution was reduced but that other elements were continuously diffused.

In the result of the ISO leaching test for 602 days, cesium, which was added in a small amount to AG8W1 in order to check the leaching behavior of cesium, was not detected, but cobalt was intermittently detected in the leachate, thus exhibiting a very small cumulative fraction leached compared to other elements.

Experimental Example 3. Pilot Test

Three types of candidate glass, which were selected in Example 2, were subjected to a pilot test using a pilot test device in order to check the ease of the vitrification process of the glass and the quality of the molten solidified body formed during the vitrification process.

The pilot test was successfully repeated five times in order to analyze the pilot test characteristic of the AG8W1 candidate glass, the pilot test was repeated twice in order to check the pilot test characteristic of the DG-2 candidate glass composition, and the pilot test of the SG candidate glass composition was performed once. The main pilot test results of the waste products are arranged in the following Table 2.

TABLE 2

Summary of pilot test results

| | Operation variables | | | Supply ratio | | |
|---|---|---|---|---|---|---|
| Waste product | No. of pilot tests | Initial ignition | Integrity of molten glass | Supply ratio during test (kg/h) | Expected appropriate supply ratio (kg/h) | Supply type |
| W1 waste product | 5 | Favorable | Favorable | 18 | 18 | Grain (waste resin)/cutting (dry active waste) |
| Dry active waste | 2 | Favorable | Favorable | 20 | 20 | Cutting |
| Waste resin | 1 | Favorable | Favorable | 7 | 7 | Grain (waste resin) |

The pilot test of the W1 waste product was continuously performed for a maximum of about 10 days, based on a single operation cycle, during which 70 kg of the AG8W1 candidate glass was used to prepare the initial molten glass, the waste product and the base glass frit AG8 were continuously supplied for 6 hours, residues were combusted for 1 hr, mixing was performed, and the glass was discharged in an increased amount. It was very easy to initially ignite the AG8W1 candidate glass used during the test and to control the molten glass when the waste product was not supplied. From the result of analysis of the discharged molten solidified body, it could be seen that a homogeneous molten solidified body was produced.

It was evaluated that the dry active waste did not particularly affect the control of process variables and the quality of a molten solidified body even when the dry active waste was supplied in amounts of 20 kg and 25 kg per hour. When the dry active waste was supplied in an amount of 20 kg per hour, the dry active waste was capable of being continuously supplied together with the DG-2 base glass frit for 8 hrs, and an operation mode was capable of being successfully performed based on a single cycle for a total of 9 hrs by combusting residue for 1 hr, performing mixing, and discharging the glass in an increased amount. Even though PVC, rubber, lancing filters, and wood were supplied into the dry active waste at content levels (5, 15, and 1 wt %) that were higher than target values (0, 11.62, 03, and 0.5 wt %) for supply to a nuclear power plant, the concentration of generated harmful gas, the dust generation amount, and the color of the dry active waste were very favorable. Therefore, it was evaluated that there is no particular problem occurring in the case where a predetermined amount of waste product is mixed and supplied due to human error while the dry active waste is classified during a commercial operation. From the result of evaluation of the chemical robustness of the molten solidified body, which was discharged at early, middle, and final stages of the pilot test, it could be seen that the glass, which was discharged during the present pilot test, exhibited better robustness than that of the SRL-EA glass, which was the benchmark glass of the high-level molten solidified body of the USA. From the pilot test, it could be seen that it was very easy to control the operation variables of vitrification of the dry active waste and that it was possible to produce a high-quality molten solidified body compared to other flammable waste products (waste resin and the like). Accordingly, the simple volume reduction ratio that is expected when the used glass composition and operation mode for the vitrification process are applied to a commercialization process is evaluated to be high, namely about 175. However, in consideration of the occurrence of secondary waste products, such as the amount of discharged waste washing solution and high-temperature filters that are no longer of any use, it was judged that the overall volume reduction ratio was slightly reduced but, nonetheless, a very high volume reduction ratio of 100 or more was capable of being ensured.

The pilot test of the waste resin was continuously performed, based on a single operation cycle, during which 70 kg of the SG candidate glass was used to prepare the initial molten glass, the waste product and the base glass frit SG-F were continuously supplied for 20 hours, residues were combusted for 1 hr, mixing was performed, and the glass was discharged in an increased amount. It was very easy to initially ignite the SG candidate glass used during the test and to control the molten glass when the waste product was not supplied. The simple volume reduction ratio, which is expected when the operation mode for the waste resin vitrification process is applied to a commercialization process, is evaluated to be about 50. Even in consideration of the occurrence of secondary waste products, it is judged that a volume reduction ratio of 30 or more was capable of being ensured.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A glass composition for vitrifying a flammable waste product, the glass composition consisting of:
    30 to 60 wt % of $SiO_2$, 6.5 to 8.5 wt % of $Al_2O_3$, 10 to 16 wt % of $B_2O_3$, 8 to 15 wt % of CaO, 1 to 6 wt % of $K_2O$, 2 to 10 wt % of $Li_2O$, 0.5 to 6 wt % of MgO, 8 to 28 wt % of $Na_2O$, 2 to 5 wt % of $TiO_2$, 0.1 to 5 wt % of $CeO_2$, 0.1 to 2 wt % of CoO, 0.1 to 5 wt % of $VO_2$, 1 to 5 wt % of ZnO, and 0.5 to 3 wt % of $ZrO_2$.

* * * * *